United States Patent
Di Paola et al.

(10) Patent No.: US 9,745,919 B2
(45) Date of Patent: Aug. 29, 2017

(54) GAS TURBINE ENGINE EXHAUST EJECTOR/MIXER

(71) Applicant: Pratt & Whitney Canada Corp., Longueuil (CA)

(72) Inventors: Franco Di Paola, Montreal Nord (CA); Guy Lefebvre, St-Bruno de Montarville (CA); Patrick L'Esperance, St Bruno de Montarville (CA); Gabriel Emard-Parent, Cookshire (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 411 days.

(21) Appl. No.: 14/446,756

(22) Filed: Jul. 30, 2014

(65) Prior Publication Data

US 2016/0032864 A1 Feb. 4, 2016

(51) Int. Cl.
*F02K 1/38* (2006.01)
*F02C 7/18* (2006.01)

(52) U.S. Cl.
CPC ............... *F02K 1/386* (2013.01); *F02C 7/18* (2013.01)

(58) Field of Classification Search
CPC ... F02K 1/34; F02K 1/36; F02K 1/386; F02K 1/46; F02K 1/48; F02C 7/20
See application file for complete search history.

(56) References Cited

U.S. PATENT DOCUMENTS

| | | | | |
|---|---|---|---|---|
| 3,053,340 A | * | 9/1962 | Kutney | F02K 1/38 181/220 |
| 3,092,205 A | * | 6/1963 | Bertram | F02K 1/40 181/213 |
| 3,579,993 A | * | 5/1971 | Tanner | F02K 1/36 181/216 |
| 3,647,021 A | * | 3/1972 | Millman | F02K 1/827 181/220 |
| 3,726,091 A | * | 4/1973 | Tontini | F02K 1/34 181/220 |
| 4,117,671 A | * | 10/1978 | Neal | F02K 1/386 239/127.3 |
| 4,226,085 A | * | 10/1980 | Johnson | F02K 1/04 60/262 |

(Continued)

FOREIGN PATENT DOCUMENTS

JP 2003065156 3/2003

OTHER PUBLICATIONS

Extended EP Search Report.
Office Action issued in corresponding EP application No. 15179131.6.

*Primary Examiner* — Carlos A Rivera
(74) *Attorney, Agent, or Firm* — Norton Rose Fulbright Canada LLP

(57) ABSTRACT

An ejector/mixer for a gas turbine engine includes an annular wall having upstream end adapted to be fastened to an engine case and a downstream end forming a plurality of lobes. A support member interconnects the lobes, and includes an annular blade located radially inwardly of the bight of the lobes. The lobes extend radially inwardly downstream relative to the annular wall and the support member includes an annular blade and has spaced apart joint surfaces spaced apart to coincide with the joint surfaces of a respective lobes. The spaced-apart joint surfaces of the support member being profiled to mate with the corresponding joint surface of the lobes.

8 Claims, 4 Drawing Sheets

(56) References Cited

U.S. PATENT DOCUMENTS

| | | | | |
|---|---|---|---|---|
| 4,335,801 | A | * | 6/1982 | Stachowiak ............... F02K 1/48 |
| | | | | 181/213 |
| 4,909,346 | A | * | 3/1990 | Torkelson ................. F02K 1/08 |
| | | | | 181/213 |
| 5,265,807 | A | | 11/1993 | Steckbeck et al. |
| 6,412,283 | B1 | | 7/2002 | Sheoran |
| 7,043,898 | B2 | * | 5/2006 | Rago ....................... F02K 1/386 |
| | | | | 181/220 |
| 7,677,026 | B2 | * | 3/2010 | Conete ..................... F02K 1/48 |
| | | | | 181/220 |
| 7,882,696 | B2 | | 2/2011 | Anderson et al. |
| 8,590,316 | B2 | | 11/2013 | Conete et al. |
| 9,188,024 | B2 | * | 11/2015 | Tardif ..................... F01D 25/24 |
| 9,399,952 | B2 | * | 7/2016 | De Sousa ............... F01D 9/065 |
| 2011/0036068 | A1 | * | 2/2011 | Lefebvre .................. F01D 9/04 |
| | | | | 60/262 |

* cited by examiner

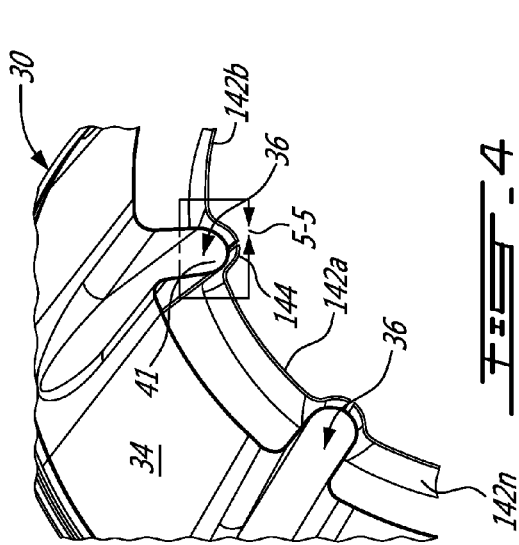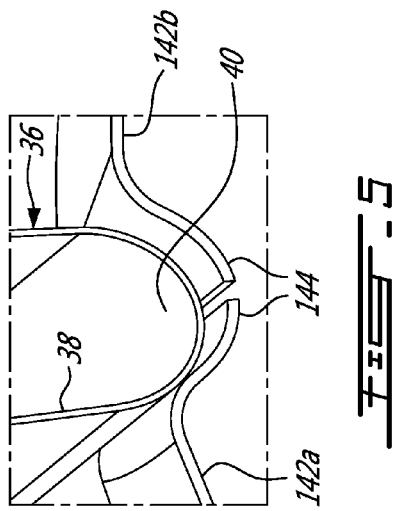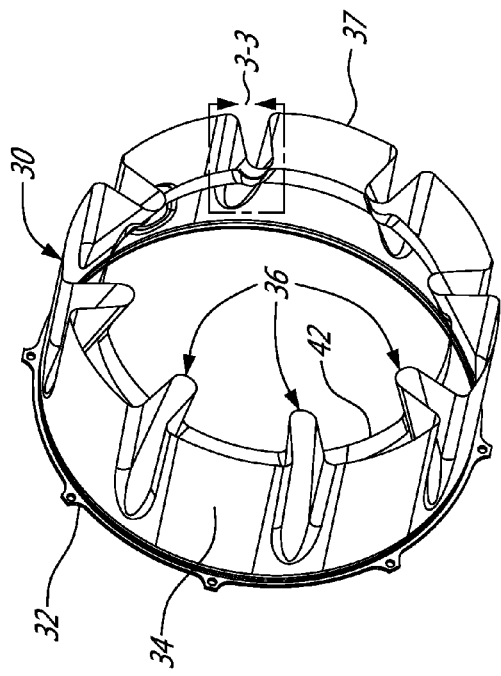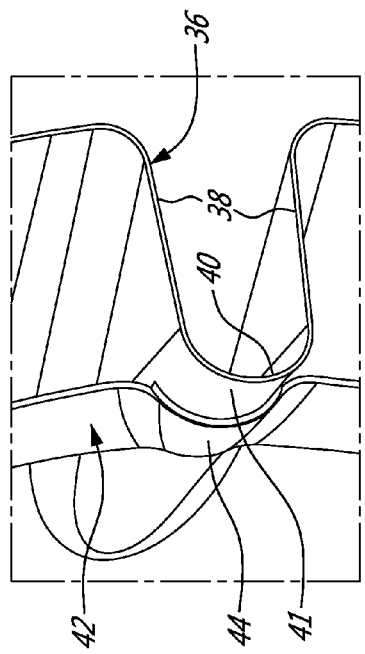

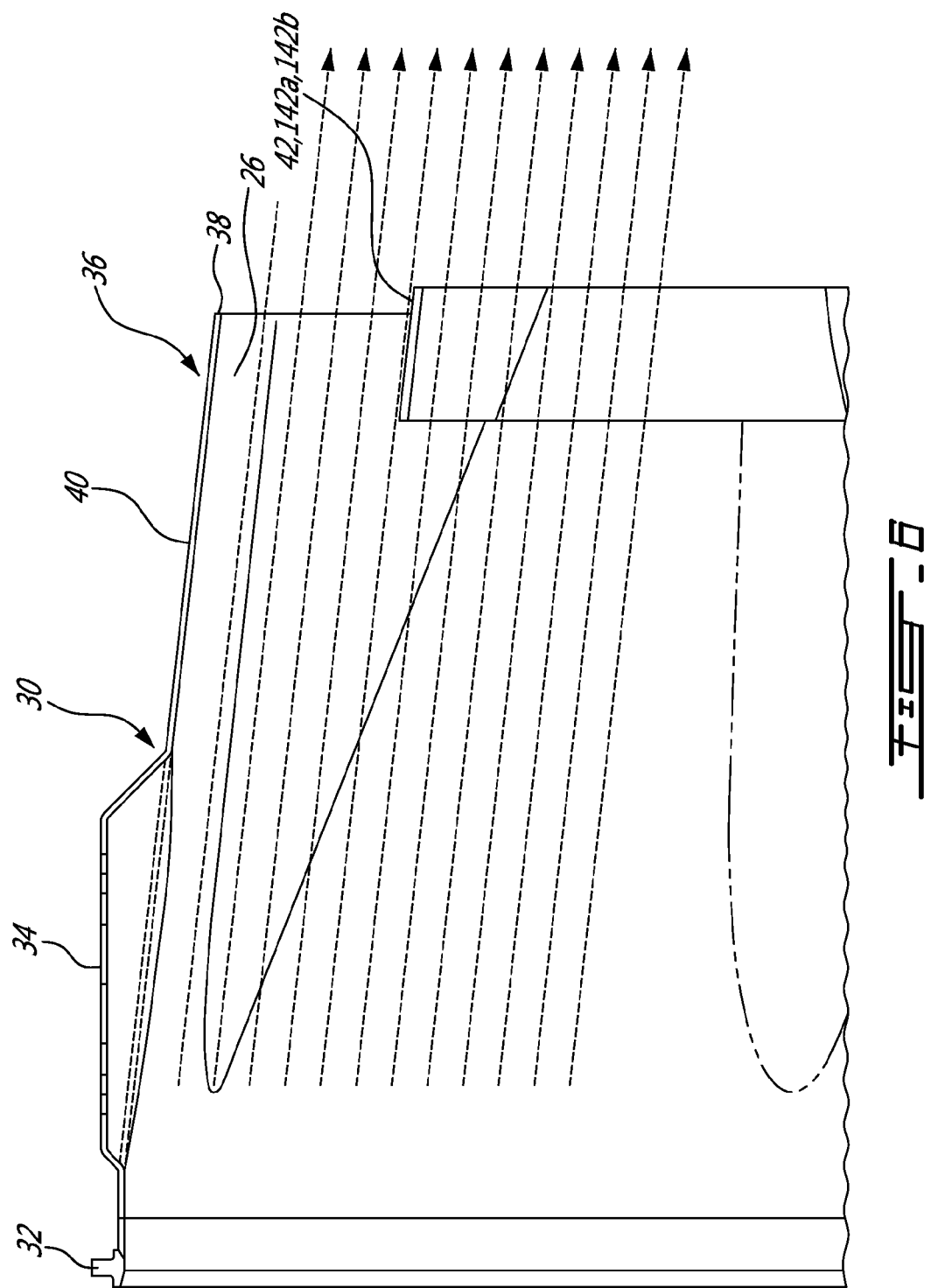

US 9,745,919 B2

GAS TURBINE ENGINE EXHAUST EJECTOR/MIXER

TECHNICAL FIELD

The application relates generally to aircraft gas turbine engines and, more particularly, to aft section of the engine including an ejector mixer.

BACKGROUND OF THE ART

In gas turbine engines, hot high velocity air exits from the turbine through the core gas path. The exhaust gases may be constrained by an exhaust case section in the form of a corrugated annular case extension having ejector/mixer lobes. Turbofan engines generally use exhaust mixers in order to increase the mixing of the high and low velocity exhaust gas flows. Turbo-shaft engines may be provided with similar devices sometimes referred to as ejectors. Exhaust mixers/ejectors may experience thermal variation and/or radial deflection due to exposure to the high and low velocity flows. In addition, exhaust ejector/mixers may be prone to vibrations, which has negative consequences for the surrounding hardware. As such, it is generally desirable to increase the stiffness or rigidity of the exhaust case. Various configurations of exhaust ejector/mixers have been proposed to date in order to try to increase the stiffness or reduce deflection thereof.

However, there remains a need for an improved exhaust ejector/mixer for a gas turbine engine.

SUMMARY

In one aspect, there is provided a gas turbine engine having an engine casing enclosing a compressor section, a combustor and a turbine section defining a main gas path serially extending therethrough, and comprising: an exhaust cone disposed downstream of the turbine section; an ejector/mixer cantilevered from an aft end of the engine casing, the ejector/mixer at least partially surrounding the exhaust cone such as to define a portion of the main gas path between an outer surface of the exhaust cone and the ejector/mixer; the ejector/mixer having a plurality of circumferentially distributed lobes; and a support member connected to at least a number of the lobes; each of the at least number of lobes formed with a trough presenting a joint surface; the support member having corresponding concave joint surfaces profiled for matingly engaging the corresponding joint surfaces of the lobes.

In another aspect there is an exhaust ejector/mixer for a gas turbine engine adapted to be mounted to a casing at an exhaust end of the gas turbine engine such as to at least partially surround an exhaust cone, the exhaust ejector/mixer comprising: an annular wall having an upstream end adapted to be fastened to an engine case and a downstream end forming a plurality of circumferentially distributed lobes; and a support member disposed towards the downstream end of the annular wall and interconnecting at least a number of the lobes, each of the at least number of lobes formed with a trough with an convex bight radially inward thereof presenting a joint surface; the support member having corresponding concave joint surfaces adapted to be joined to the mating convex joint surfaces of the lobes.

The exhaust ejector/mixer may be provided for a turbofan engine where alternating lobes extend alternatively radially outwardly and radially inwardly. In the this case the support member is joined to the inwardly extending members only.

For a turbo-shaft engine, the lobes might extend inwardly only, in which case the support member is joined to every lobe.

BRIEF DESCRIPTION OF THE DRAWINGS

Reference is now made to the accompanying figures in which:

FIG. 2 is a rear isometric view of an exhaust ejector/mixer, having a support member connected to the ejector/mixer lobes thereof, in accordance with one embodiment of the present disclosure;

FIG. 3 is an enlarged fragmentary, isometric view of a lobe and support member according to FIG. 2;

FIG. 4 is a fragmentary rear isometric view an ejector/mixer, having a support member connected to the lobes thereof, in accordance with another embodiment;

FIG. 5 is an enlarged fragmentary, isometric view of a lobe and support member according to FIG. 4;

FIG. 6 is a schematic, axial cross section of a portion of the ejector/mixer showing the main gas path, and the support member located and oriented in the gas path.

DETAILED DESCRIPTION

Figure 1:
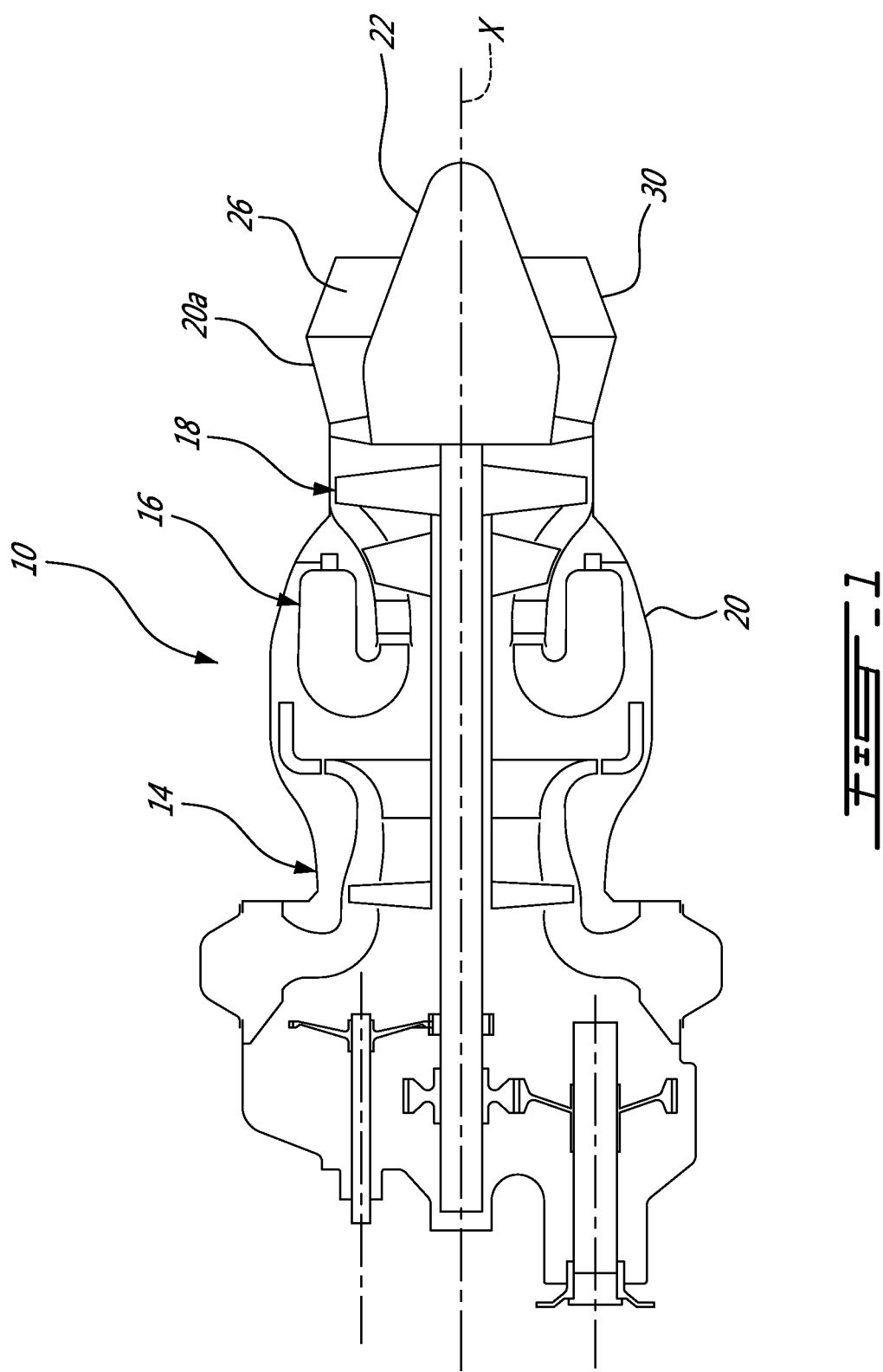
FIG. 1 is a schematic cross-sectional view of a turbo-shaft gas turbine engine.

FIG. 1 illustrates a turbo-shaft gas turbine engine 10 of a type preferably provided for use in subsonic flight, generally comprising in serial flow communication a compressor section 14 for pressurizing the air, a combustor 16 in which the compressed air is mixed with fuel and ignited for generating an annular stream of hot combustion gases, and a turbine section 18 for extracting energy from the combustion gases. The gas turbine engine 10 includes a core engine casing 20 which encloses the turbo machinery of the engine. The main air flow passes through the core of the engine via a main gas path 26, which is circumscribed by the core engine casing 20 and allows the flow to circulate through the multistage compressor 14, combustor 16 and turbine section 18 as described above.

At the aft end of the engine 10, an exhaust cone 22 is centered about a longitudinal axis X of the engine 10, the exhaust cone 22 being connected to an aft end of the turbine section 18. The exhaust cone 22 has an outer surface, which defines an inner wall of the main gas path 26 so that the combustion gases flow therearound. An ejector/mixer 30 forms the outer wall of the aft end of the main gas path 26. As best seen in FIG. 2, the ejector/mixer 30 includes an annular wall 34 with a radial fastening ring or flange 32 upstream thereof. The fastening ring 32 is adapted to be mechanically fastened to the aft portion 20a (FIG. 1) of the casing 20.

Referring to FIGS. 2 and 3, in further detail, the annular wall 34 of the ejector/mixer 30, includes and defines a plurality of circumferentially distributed radially inner lobes 36 extending axially rearwardly from a front frusto-conical portion of the annular wall 34 to a downstream edge 37, i.e. a trailing edge thereof. The lobes 36 include side, radially-extending, walls 38 with a bight forming an arcuate trough 40. The trough 40 presents a convex surface 41 on the radially inner or central side of the annular wall 34.

An annular support member includes a blade 42 extending concentrically about the longitudinal axis X of the engine 10. In the embodiment shown, the blade 42 comprises an annular longitudinal, flat bar. The blade 42 is interrupted only at form-fitting joint areas 44. The joint areas 44 are located on the blade 42 to correspond with the convex surfaces 41 of the lobes 36. The joint areas 44 are curved so that it complements the convex surface 41, as shown in FIG. 3. The curved joint area 44 is concave relative to the convex surface 41 of the lobe 36. The blade 42 is spaced radially outwardly and independent from the exhaust cone 22 and floats with respect thereto. The blade 42 in one embodiment is a thin sheet metal strip capable of being welded to the sheet metal forming the annular wall 34. In the embodiment shown in FIGS. 2 and 3, the thin sheet metal strip is formed into a continuous ring.

As mentioned, the ejector/mixer 30 is solely connected to the engine 10 at the aft end 20a of the core engine casing 20, and so, the ejector/mixer 30 is effectively cantilevered from the core engine casing 20. This cantilevered configuration allows the lobes 36 of the exhaust ejector/mixer 30 to vibrate at one or more modes in the engine operating frequency range, while remaining relatively stiff. In addition, the thermal variations in the exhaust mixer 32 due to the high and low velocity flows through the main gas path 26 may cause axial and radial displacements in the ejector/mixer 30, which can accordingly be absorbed by the exhaust ejector/mixer 30. Moreover, the downstream end 37 of the ejector/mixer 30, which would otherwise be prone to deflection, is reinforced by the blade 42 which serves to increase the rigidity of the exhaust ejector/mixer 30 and thus inhibit movement at the downstream end 37 thereof. By joining all the lobes 36 together with the blade 42, any movement of the ejector/mixer 30 is reduced, as are the vibrations thereof. In addition, by providing a blade 42 which is independent of the exhaust cone 28, i.e. it is free to move relative thereto such as to absorb any vibrations or thermal growth mismatches therebetween. The blade 42 is able to accommodate any axial or radial displacements due to such thermal variations. As such, the ejector/mixer 30 provides enhanced rigidity and may accommodate thermal variations, vibrations and other displacements, as required.

Another embodiment is shown in FIGS. 4 and 5. In this case, the blade is made up of blade segments 142a, 142b . . . 142n. Each segment has a length corresponding to the distance between the center lines of two adjacent lobes 36. Each end of the segment terminates in a partially formed concave curve to complement part of the convex surface 41 of the lobe 36. For instance, as shown in FIG. 5, corresponding ends of segments 142a and 142b make-up the form fitting joint area 144.

The blade 42, 142 may be located at different axial positions along the convex surfaces 41 of the lobe 36. FIG. 3 illustrates a blade 42 being spaced upstream from the trailing edge 37, of the lobe 36. As shown in FIG. 5, the blade 142 is located at or slightly downstream from the trailing edge 37, of the lobe 36. The blade 42, 142 may be fixed to the convex surfaces 41 of the lobes 36 at joint areas 44, 144 using a combination of resistance, fusion or ball tack welding with a brazing application, or other types of suitable bonding that are well known in the art.

Figure 7:
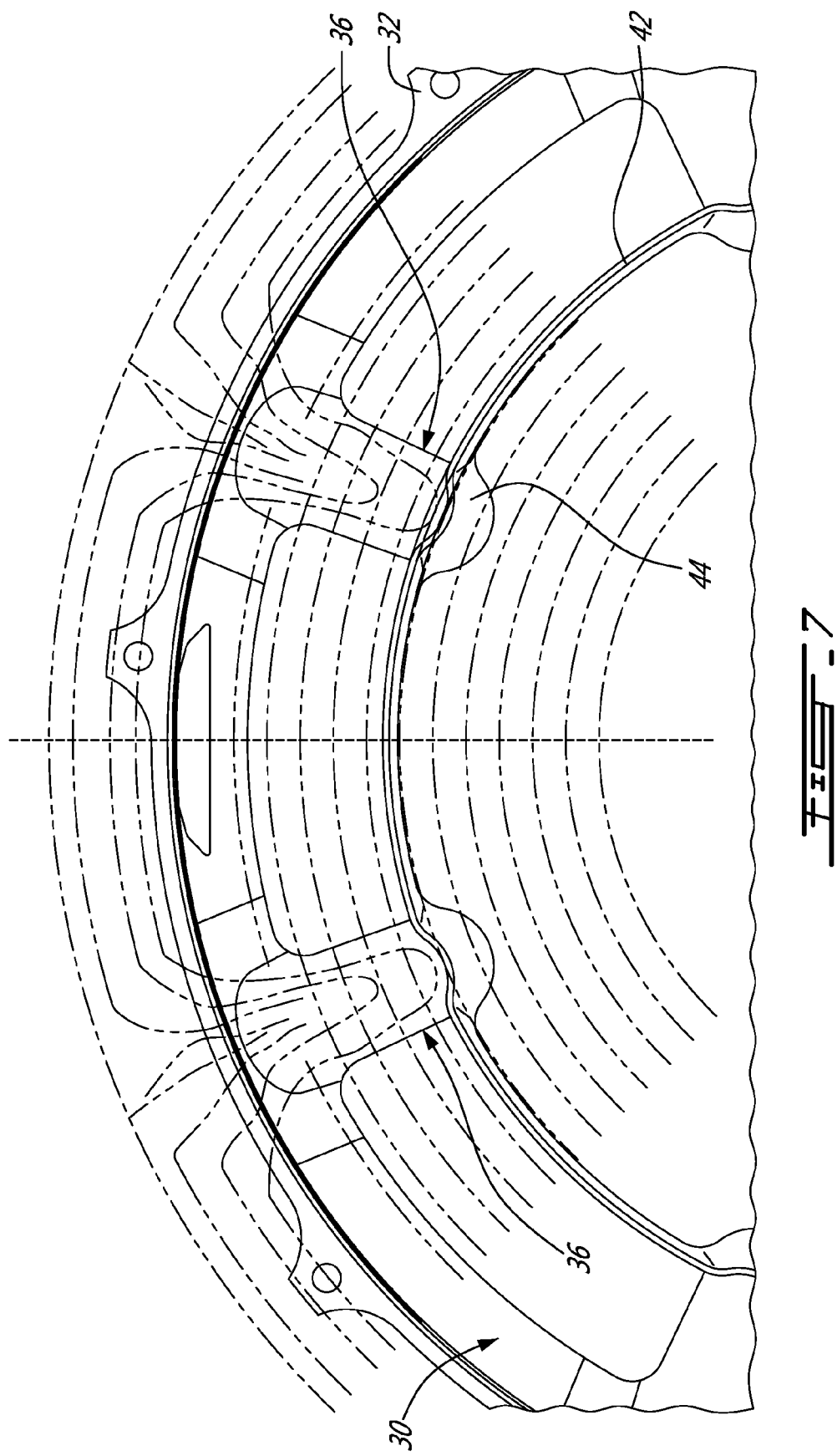
FIG. 7 is a schematic, radial cross section of a portion of the ejector/mixer showing the hot main gas path and the induced cool air in the lobes; and illustrating the relative location of the support member.

The injector/mixer 30, in the present embodiment, acts to induce cool air, exterior of the engine casing 20, to be drawn radially inwardly through the lobes 36 to cool the mechanical parts of the injector/mixer 30. As previously mentioned, the support member is often, according to the prior art, subject to thermal stresses caused by the entrained cool air and of the hot air exiting the turbine 18. FIGS. 6 and 7 show the gases flow in the ejector/mixer 30. The blade 42, 142 is disposed directly in the main gas path 26 and is shaped to be laminar with the flow of the hot gases, as can be seen in both FIGS. 6 and 7. The blade 42 is essentially exposed only to the hot gases flowing in the main gas path 26. This reduces the thermal gradient in the blade 42, 142.

The embodiments described show a turbo-shaft engine. However, in the case of a turbofan engine, cool air from the fan is directed to the ejector/mixer 30 which in such a case would have inner and outer alternating lobes to best mix the hot gases with the cool air. U.S. Pat. No. 5,265,807 Steckbeck et al 1993; U.S. Pat. No. 7,677,026 Conete et al 2010; and U.S. Pat. No. 8,739,513 Lefebvre et al 2014 describe exhaust mixers which are herewith incorporated by reference.

The above described embodiments provides an improved exhaust ejector/mixer for a gas turbine engine where the thermal stresses on the support member are reduced for improved longevity.

It is noted that the ejector/mixer and the support member could be made by additive manufacturing processes, such as direct metal laser sintering. Therefore, the ejector/mixer and the support member could be made monolithically.

The above description is meant to be exemplary only, and one skilled in the art will recognize that changes may be made to the embodiments described without departing from the scope of the invention disclosed. For example, the invention may be used with various types of gas turbine engines where cool and hot gases may simultaneously be in contact with the machinery involved. Still other modifications which fall within the scope of the present invention will be apparent to those skilled in the art, in light of a review of this disclosure, and such modifications are intended to fall within the appended claims.

The invention claimed is:

1. A gas turbine engine having an engine casing enclosing a compressor section, a combustor and a turbine section defining a main gas path serially extending therethrough along a longitudinal axis of the engine, and comprising:

an exhaust cone disposed downstream of the turbine section;

an ejector/mixer cantilevered from an aft end of the engine casing, the ejector/mixer at least partially surrounding the exhaust cone such as to define a portion of the main gas path between an outer surface of the exhaust cone and the ejector/mixer; the ejector/mixer having a plurality of circumferentially distributed lobes; and a support ring concentric with the longitudinal axis of the engine and disposed within the main gas path, the support ring radially outside of the exhaust connected to at least a number of the lobes; the lobes having troughs presenting convex joint surfaces on a radially inner side of the troughs; the support ring having circumferentially spaced-apart concave joint surfaces formed with a shape conforming to the convex joint surface of the troughs of the lobes and matingly engaged therewith to form joint surfaces.

2. The gas turbine engine according to claim 1, wherein the trough has a convex bight radially inward thereof, wherein the trough of the lobes is a convex joint surface, and wherein the concave joint surfaces of the support ring have a concave profile configured to embrace the convex joint surface of the lobes.

3. The gas turbine engine according to claim 2, wherein the support ring is provided in the form of an annular blade oriented and shaped to be laminar with a flow of hot gases through the main gas path.

4. The gas turbine engine according to claim 3, wherein the convex joint surface of each lobe is arcuate and the concave joint surfaces of the annular blade are also arcuate to mate with the convex joint surface of a corresponding lobe.

5. The gas turbine engine according to claim 3, wherein the annular blade is a circumferentially continuous one-piece metallic strip.

6. The gas turbine engine as defined in claim 5, wherein the annular blade is made up of blade segments, wherein each segment has a length corresponding to the distance between the centerlines of two adjacent lobes and each end has a partial concave arcuate surface adapted to mate with a portion of the convex joint surface of a corresponding lobe.

7. The gas turbine engine as defined in claim 3, wherein the engine is a turbo-shaft engine and the lobes are configured to induce cool air from the exterior of the engine casing to channel within the lobes.

8. The gas turbine engine as defined in claim 3, wherein the engine is a turbofan engine and the inwardly extending lobes are part of a series of radially and radially outwardly alternating lobes.

\* \* \* \* \*